United States Patent [19]

Keech

[11] Patent Number: 4,703,956
[45] Date of Patent: Nov. 3, 1987

[54] T-FITTING FOR USE WITH DIFFERENT DIAMETER PIPES

[75] Inventor: David W. Keech, Bryan, Ohio

[73] Assignee: The Scott & Fetzer Company, Fort Wayne, Ind. ; 44

[21] Appl. No.: 919,853

[22] Filed: Oct. 16, 1986

[51] Int. Cl.⁴ .......................... F16L 44/00; F04B 41/06
[52] U.S. Cl. .................................... 285/156; 285/177; 285/915; 417/3
[58] Field of Search ................... 285/177, 156, 915, 4, 285/3

[56] References Cited

U.S. PATENT DOCUMENTS

| | | | |
|---|---|---|---|
| 1,684,582 | 9/1928 | Hoaglund | 285/177 X |
| 2,453,024 | 11/1948 | Lomelino | 285/156 X |
| 2,937,889 | 5/1960 | Palmese | 285/156 X |
| 3,010,660 | 11/1961 | Barrett . | |
| 3,091,483 | 5/1963 | Hruby, Jr. | 285/156 X |
| 3,378,282 | 4/1968 | Demler, Sr. . | |
| 3,381,982 | 5/1968 | Elek | 285/177 X |
| 3,593,732 | 7/1971 | Holscher . | |
| 3,602,531 | 8/1971 | Patry . | |
| 3,690,703 | 9/1972 | Philipps . | |
| 3,726,606 | 4/1973 | Peters | 417/411 X |
| 3,831,983 | 8/1974 | Stickler . | |
| 3,967,836 | 7/1976 | Izzi, Sr. | 285/915 X |
| 4,013,309 | 3/1977 | Quick . | |
| 4,222,711 | 9/1980 | Mayer . | |
| 4,260,181 | 4/1981 | Curtin . | |
| 4,391,551 | 7/1983 | Belcher | 285/156 X |
| 4,514,244 | 4/1985 | Shaefer et al. . | |
| 4,631,001 | 12/1986 | Keech . | |

FOREIGN PATENT DOCUMENTS

| | | | |
|---|---|---|---|
| 514699 | 6/1954 | Belgium | 285/156 |
| 530177 | 7/1931 | Fed. Rep. of Germany | 285/177 |
| 1537833 | 8/1968 | France | 285/177 |

*Primary Examiner*—Thomas F. Callaghan
*Attorney, Agent, or Firm*—George Pappas

[57] ABSTRACT

A T-fitting for use with pipes of different diameter sizes includes a generally T-shaped hollow body defining a central flow transition passageway, and three spaced-apart pipe-connecting hollow ends formed on the body in flow communication with its central flow transition passageway. A pair of the pipe-connecting ends share a common axis and are disposed in opposing relation on the body. Each of the pair of pipe-connecting ends has a pair of tandemly-arranged outer and inner pipe-receiving sections defining respective outer and inner passageways in flow communication with the central passageway. The outer passageway is larger in diameter than the inner passageway, and the respective outer and inner sections have outer and inner shoulders with respective outwardly-facing internal surfaces adapted to abut with ends of pipes of different size diameters when received in the respective passageways. The other pipe-connecting hollow end is disposed generally between and offset from the common axis of the two pipe-connecting ends and has an axis extending in a generally orthogonal relation to the common axis.

4 Claims, 7 Drawing Figures

T-FITTING FOR USE WITH DIFFERENT DIAMETER PIPES

BACKGROUND OF THE INVENTION

This invention relates generally to connecting pipes together, such as is done in installing a sump pump system having a primary sump pump and an emergency sump that takes over in the event the primary sump pump fails. More specifically, the invention is directed to a T-fitting useful in connecting pipes of different diameters together.

In recent times, flooding has become common in urban areas due to many reasons ranging from faulty construction to decreasing ground area in urban locations wherein the amount of water can be soaked up is reduced. As a result, homeowners are requiring reliable sump systems which can adequately pump accumulating water out of basements and crawl spaces. Accordingly, many homeowners have turned to secondary sump pump systems similar to that disclosed in U.S. Pat. No. 3,726,606 wherein a secondary pump is incorporated in a sump system such that it is energized when the primary pump cannot keep up with the incoming water. Further, the secondary pump can be made to run on a direct current motor such that it can be energized by batteries when the primary pump fails due to a power outage or failure. Naturally, because of the tremendous amount of damage that can be done by water seepage, and because flood and water insurance is comparatively costly, an increasing number of homeowners are installing sump systems with secondary pumps.

Installing a secondary pump system, however, for many homeowners is difficult due to the pipe connections required and due to the costs involved. The check valve and other piping required between the secondary pump and the T-fitting are generally costly and difficult to install.

Frequently, it is also necessary to make connections between pipes of different diameter sizes. T-fittings are known in the prior art which accommodate different pipe diameters, for example, the ones disclosed in U.S. Pat. Nos. 3,381,982 and 3,831,983. However, most prior art fittings, such as the ones cited, appear to be composed of a multitude of parts and are thus too costly.

SUMMARY OF THE INVENTION

It is the principal object of the invention to provide a less costly, easier installable T-fitting which has expanded capabilities over those known heretofore. While the T-fitting is usable to install sump pump apparatus, it has general application to a wide variety of plumbing activities.

It is also an object of the invention to provide a T-fitting of one-piece molded construction which will accommodate pipes of different diameter sizes without the use of special adapters or connectors.

Accordingly, the invention is directed to a T-fitting for use with pipes of different diameter sizes wherein the T-fitting includes a generally T-shaped hollow body defining a central flow transition passageway, and at least three spaced-apart pipe-connecting hollow ends formed on the body in flow communication with its central flow transition passageway. At least one and preferably a pair of the pipe-connecting ends each has a pair of tandemly-arranged outer and inner pipe-fitting or pipe-receiving sections defining respective outer and inner passageways in flow communication with the central passageway. The outer passageway is larger in diameter than the inner passageway, and the respective outer and inner sections have means in the form of outer and inner shoulders with respective outwardly-facing internal surfaces adapted to abut with ends of pipes of different size diameters when received in the respective passageways.

Preferably, a pair of the pipe-connecting ends share a common axis and are disposed in opposing relation on the body. The other pipe-connecting hollow end is disposed generally between and offset from the common axis of the two pipe-connecting ends and has an axis extending in a generally orthogonal relation to the common axis. The outer and inner pipe-receiving sections of the two pipe-connecting ends of the pair preferably have substantially identical diameters.

Other objects and advantages of the invention will become apparent from the following specification taken in conjunction with the accompanying drawings.

DESCRIPTION OF A SPECIFIC EMBODIMENT

Figure 1:
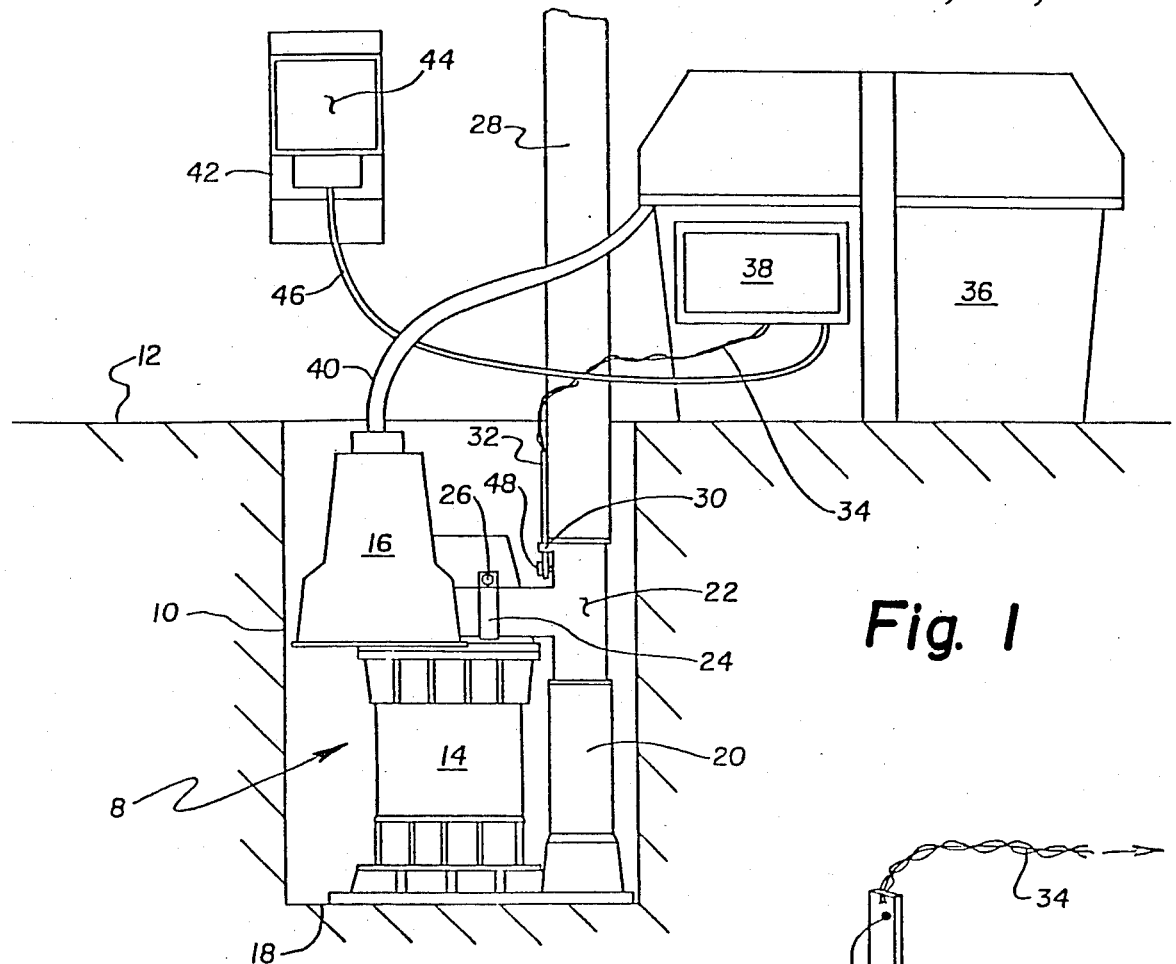
FIG. 1 is a sectional view of a sump hole showing the device completely assembled with a primary and secondary pump connected by the T-fitting to a common exhaust, a water level sensing device mounted on said T-fitting and, outside of the sump hole, showing a battery pack and an alternating current source.

Referring to FIG. 1, there is a sump assembly generally designated by arrow 8 within sump hole 10 located vertically below floor 12. The sump assembly 8 within sump hole 10 rests upon sump hole floor 18. Sump assembly 8 includes primary sump pump 14 connected to an alternating current source (not shown) and a secondary sump pump 16 connected to a direct current source via secondary pump power wires 40. Secondary sump pump power wires are connected to battery pack 36 having necessary control switches and mode indicators (not shown) within control panel 38. Battery pack 36 is kept fully charged by receiving AC power from an ordinary receptacle 42 through plug 44 and extension cord 46.

Figure 2:
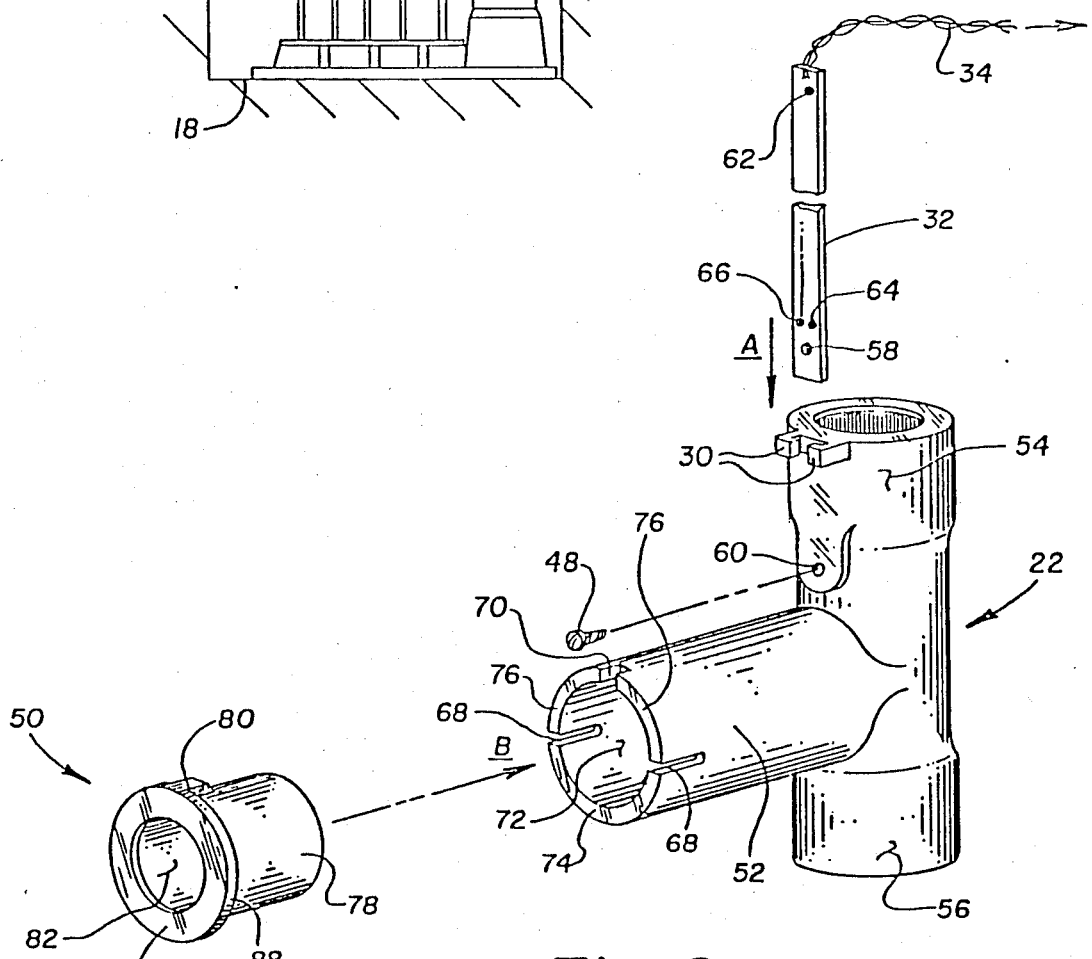
FIG. 2 is an exploded, perspective view showing the one-way flapper valve, the T-fitting and the water level sensing device.

Referring now to both FIGS. 1 and 2, water level sensor 32 is mounted upon T-fitting 22 by sliding it, in the direction indicated by arrow A, through L-shaped arms 30 extending outwardly from the exhaust connecting end 54 and fastening it thereupon by inserting T-fitting screw 48 through sensor hole 58 and securing said T-fitting screw 48 within screw hole 60. Water level sensor 32 is a common flat, rectangular circuitboard having conductive points 62, 64 and 66 thereon, each connected to and corresponding to a wire within a group of water level sensor wires 34 leading and connected to battery pack 36.

Electrical circuitry within control panel 38 connected to water level sensor wires 34 is capable of sensing a short circuit occurring between conductive point 62 and 64 and between conductive point 66 and 64. Thus, if the water level within sump hole 10 rises, submerging conductive points 64 and 62, the water acting as a conductor short circuits conductive points 62 and 64. The short circuit is sensed by the electrical circuitry within control panel 38 which in turn energizes secondary sump pump 16 via secondary sump pump power wires 40. The electrical circuitry continues to energize secondary sump pump 16 as long as a short circuit is sensed across conductive points 66 and 64. Therefore, when the water level within sump hole 10 drops below conductive points 66 and 64, the short circuit between those two points, occurring through the water, is eliminated and, thus, the electrical circuitry is triggered to deenergize secondary sump pump 16.

This method of triggering the "on" and "off" modes of secondary pump 16 by sensing current flow between the above designated conductive points will work with direct current so long as minerals and other impurities exist in the water so that the water can act as a conductor. Using direct current, has disadvantages in that if the water has no impurities within it, a short circuit cannot be created and thus the water level cannot be sensed by the electronic circuitry. Further, direct current causes impurities to build up on the conductive points thereby also stopping a short circuit from occurring. Thus, the preferred embodiment requires that an alternating current source at conductive point 64 transmit an electromagnetic wave which can be sensed by conductive points 62 and 66. The electronic circuitry senses the capacitance between points 62 and 64 and between points 66 and 64 and turns secondary pump 16 "on" and "off" accordingly. By using alternating current, the water level can be sensed whether or not impurities exist in the water and, further, impurities do not build up on the conductive points.

Under normal operation, primary sump pump 14 pumps water which accumulates in sump hole 10 through the primary pump outlet 20 leading to T-fitting 22 and finally out through the common exhaust 28. The primary pump outlet 20 is connected to the primary pump connecting end 56 of T-fitting 22 by commonly known PVC pipe connecting means such as gluing and fitting together. Common exhaust pipe 28 is connected to the exhaust connecting end 54 of T-fitting 22 in the same manner as primary pump outlet 20 is connected to T-fitting 22. Although not illustrated, a check valve is located at the discharge of the primary pump 20.

As water is forced out through common exhaust 28 by the primary sump pump 14, the water is restrained from exiting the T-fitting through the secondary pump connecting end 52 by the one-way flow valve 50 which is inserted inside of secondary pump connecting end 52 as indicated by arrow B. Secondary connecting end 52 is generally cylindrically shaped and has two axially disposed slots 68 located at the end thereof. Said slots 68 split up the outer portion of the secondary pump connecting end into a lower radial periphery 74 and an upper radial periphery 76. Thus, the lower radial periphery 74 and the upper radial periphery 76 become moderately flexible with respect to each other and the remaining portion of secondary pump connecting end 52. Upper radial periphery 76 has an axial notch 70 extending therethrough so as to receive the one-way flow valve protrusion 80 when said one-way flow valve 50 is inserted into secondary pump connecting end 52 as indicated by arrow B. The notch 70 and valve protrusion 30 act together to prevent radial movement of the one-way flow valve 50 within secondary pump connection end 52. The cooperation between protrusion 80 and notch 70 also facilitates the accurate and consistent alignment of the flow valve 50 with T-fitting 22.

Referring generally to FIGS. 2 through 6, one-way flow valve 50 is a single injected molded piece made of nitrile rubber having a cylindrical valve body 78 which is slightly smaller than and fits tightly against the secondary pump connecting end cylinder interior 72. In the back portion of the cylindrical valve body 78 there exists a lip consisting primarily of lip back portion 84, lip outer periphery 88 and lip seat 86. When the one-way valve 50 is inserted into the secondary pump connecting end 52, said lip seat 86 rests tightly against secondary pump connecting end upper and lower radial peripheries 76 and 74. In this fashion, said lip keeps the one-way flow valve 50 from slipping and traveling axially into secondary pump connecting end 52 as water is forced through the one-way valve cylindrical channel 82.

One-way flow valve 50 has a flapper cap in the front thereof generally designated 104. Flapper cap 104 has a front portion 90 and a back seat portion 92. Flapper cap 104 is connected by hinge 98, which is also made of nitrile rubber, to valve seat 96 located at the front portion of cylindrical valve body 78. Flapper cap hinge 98 is comparatively thin as shown in FIG. 5 and has notched ends 94 as shown in FIG. 3 so that flapper cap 104 can easily be moved by the water pressures created thereupon.

When connecting the secondary pump 16 to the T-fitting 22, one-way flow valve 50 is first inserted into the secondary pump connecting end 52 so that valve protrusion 80 is received within notch 70 and lip seat 86 rests against secondary pump connecting end upper and lower radial peripheries 76 and 74. Cylindrical valve body 78 is thus also resting against secondary pump connecting end cylindrical interior 72. The secondary pump outlet (not shown) is then inserted into the one-way valve cylindrical channel 82. The secondary pump outlet must not touch the seat back portion 102 so as to not interfere with valve seat 96 and overall proper valving. The secondary pump outlet made of substantially rigid material is cylindrical shaped and fits snuggly within valve cylindrical channel 82. Thereafter, circular clamp 24 (FIG. 1) is placed around the secondary pump connecting end close to its outer radial periphery and tightened thereupon using clamp bolt 26. The radial forces created by circular clamp 24 force the flexible upper and lower radial peripheries 76 and 74, respectively, radially inward so that the secondary pump connecting end cylindrical interior 72 is frictionally tightened against cylindrical valve body 78 and valve cylindrical channel 82 is frictionally tightened against the secondary pump outlet (not shown). Thus, the secondary pump outlet, one-way valve 50, and T-fitting 22 are fastened together preventing axial movement with respect to each other, and further also, creating a seal between all three parts so that water does not leak therethrough.

Figure 3:
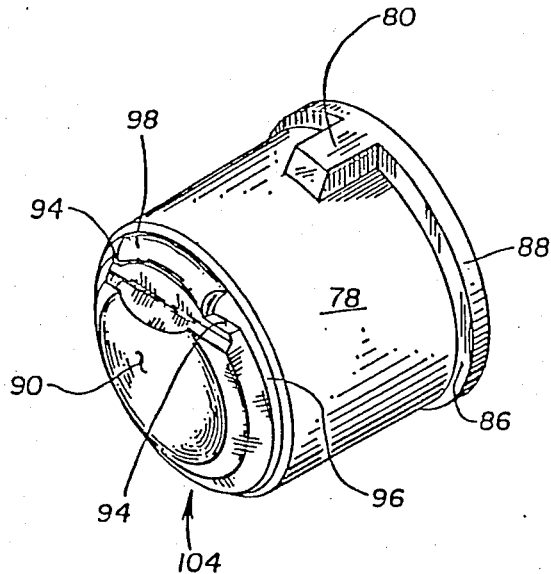
FIG. 3 is a front perspective view of the one-way flapper valve showing the protrusion on the back side and the flapper cap along with the hinge means on the front side.
Figure 4:
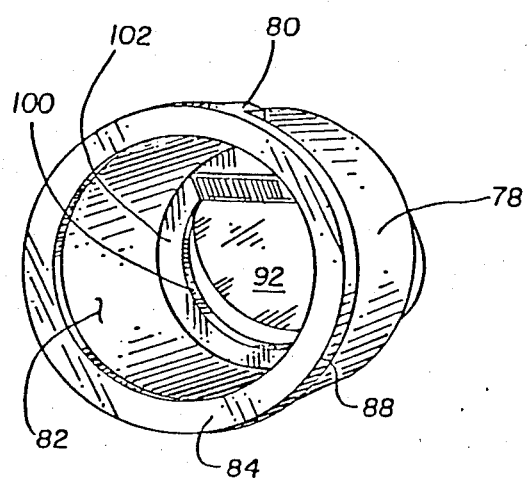
FIG. 4 is a back perspective view of the one-way flapper valve showing its cylindrical opening therethrough and the retaining lip.
Figure 5:
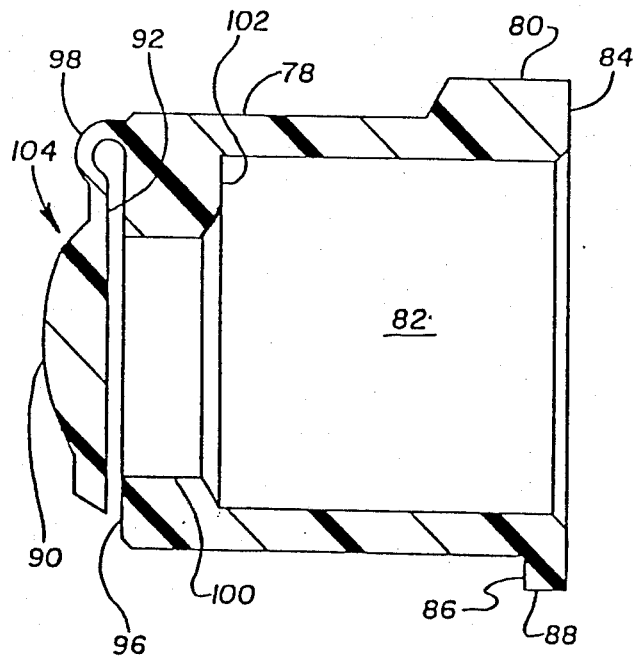
FIG. 5 is a cross-sectional view of the one-way flapper valve.
Figure 6:
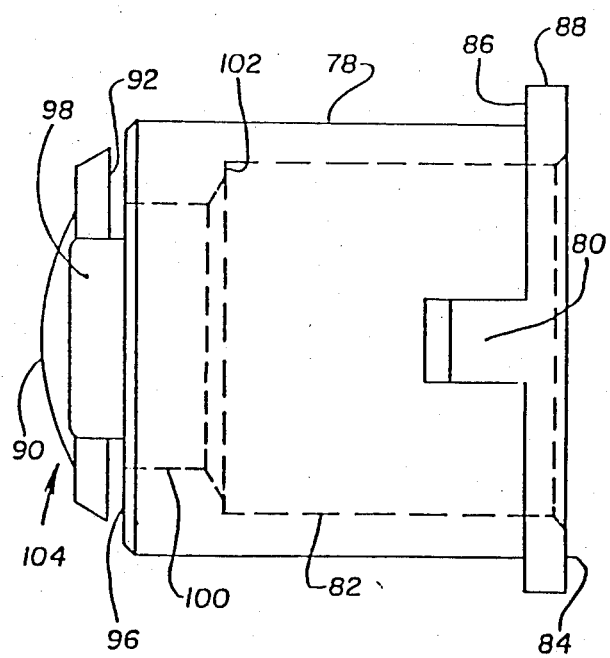
FIG. 6 is a top plan view of the one-way flapper valve showing the opening therethrough with hidden lines.

In operation, when neither the primary pump 14 nor the secondary pump 16 are energized, flapper cap 104 hangs downwardly as shown in FIGS. 3 and 5 due to gravitational pull. Hinge 98 is always kept vertically above flapper cap 104 due to valve protrusion 80, which is received in notch 70 restricting radial movement by one-way valve 50. When the primary pump 14 is energized and water is pumped through T-fitting 22, water pressure is provided on the flapper cap front portion 90 thereby pushing flapper cap 104 back toward valve seat 96 and thereby creating a seal between flapper cap seat 92 and valve seat 96. It has been found that the specific embodiment herein disclosed requires two feet of head so as to substantially seal.

When the water level sensor, along with its electronic circuitry, has determined that the water level has risen to a level wherein point 62 is covered by water, secondary pump 16 is energized thus creating water pressure against flapper cap seat 92. Thereafter, so long as the pressure created on flapper cap seat 92 is greater than the pressure created on flapper cap front 90, flapper cap 104 swings forward and upwardly allowing the water to flow therethrough. Thus, water pumped by the secondary pump 16 will flow through the secondary pump outlet (not shown) through the valve cylindrical channel 82 and seat opening 100 and then enter secondary pump connecting end 52 leading to common exhaust 28 via T-fitting 22. It can be appreciated that the hinge 98 displaces cap 104 to a sufficient degree so that water flow friction is minimized as the water is pumped through cylindrical channel 82 and out of seat opening 100. When the primary pump 14 is not energized, to prevent water being pumped by secondary pump 16 from traveling downwardly through primary pump outlet 20 and into sump hole 10, a common check valve or a flapper cap one-way flow valve as disclosed herein may be utilized within the primary pump outlet or within the primary pump connecting end 56.

As can be appreciated, applicant has provided an emergency sump pump assembly consisting of a primary sump pump and a secondary sump pump which are fluidly connected by a T-fitting to a common exhaust. The operation of the assembly can be summarized in that the primary sump pump is designed to maintain the fluid in the sump between two predetermined levels. The highest one of these predetermined levels is below the level at which the secondary sump pump would become energized. In the event the primary sump pump malfunctions or is unable to pump fluid from the sump at a sufficient rate, the fluid level will rise to a predetermined high level at which time the secondary sump pump will be energized. The secondary sump pump will then pump water from the sump through the T-fitting and out the common exhaust until it reaches a predetermined low level, at which time the secondary sump pump will become deenergized. As can be appreciated, the existence of the secondary sump pump provides a back up for the primary sump pump in the event it fails or is unable to maintain an adequate output flow.

It should be further mentioned that although an electronic water sensing device has been discussed, it would also be possible to utilize a conventional float switch device wherein a mercury-type switch is contained within a float connected to the secondary sump pump switch by an arm and this structure designed so that the secondary sump pump can maintain the fluid level between two predetermined levels as discussed earlier.

Figure 7:
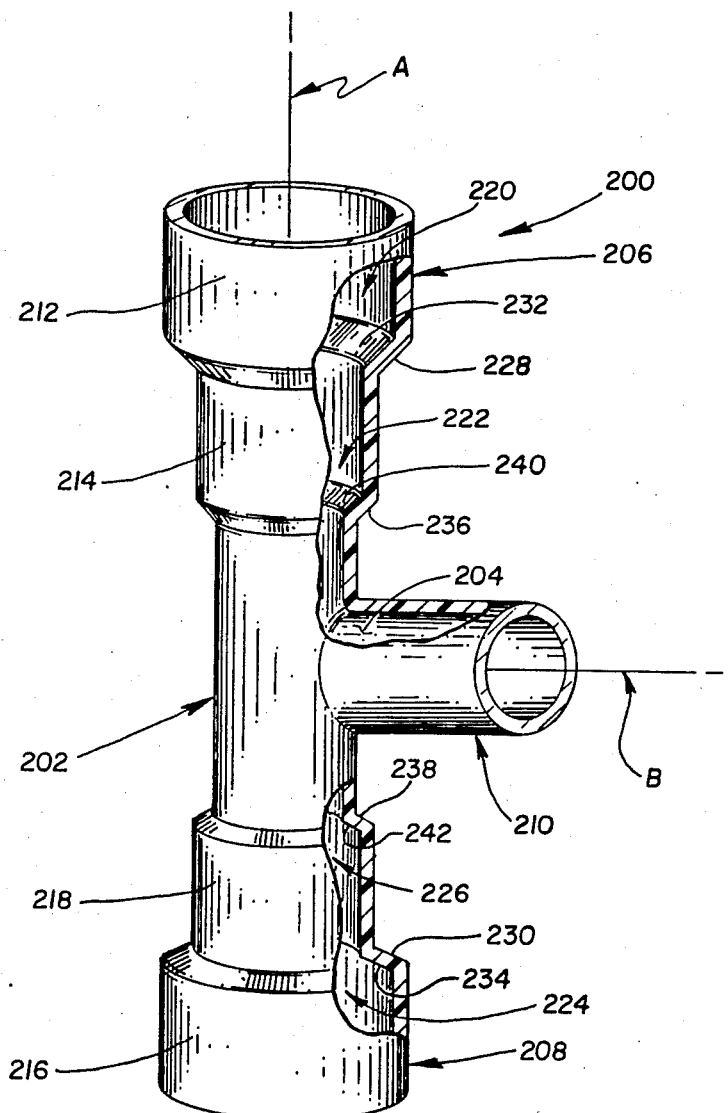
FIG. 7 is a perspective view, with portions broken away and sectioned, of an alternative form of the T-fitting which constitute the present invention.

FIG. 7 illustrates another T-fitting 200 having a construction which adapts it for use with pipes of different diameter sizes. Whereas the T-fitting 200 can be combined with the water level sensor 32 of FIG. 2 and then substituted for the T-fitting 22 in the sump apparatus, it is not so limited. It is capable of use in a wide variety of other plumbing applications.

Basically, the T-fitting 200 includes a generally T-shaped hollow body 202 defining a central flow transition passageway 204 and three spaced-apart pipe-connecting hollow ends 206, 208 and 210 formed on the body in flow communication with its central flow transition passageway. Preferably, the T-fitting 200 has a molded one-piece construction fabricated from any suitable material, one being a plastic known as PVC.

At least one, but preferably a pair of the pipe-connecting ends, specifically the upper end 206 and lower end 208 which share a common axis A and are disposed in opposing relation on the body 202, have respective pairs of tandemly-arranged outer and inner pipe-fitting or-receiving sections 212,214 and 216,218. The respective sections 212,214 and 216,218 define corresponding outer and inner passageways 220,222 and 224,226. The inner passageways 222,226 are in flow communication with the corresponding outer passageways 220,224 and the central passageway 204. The outer passageways 220,224 are respectively larger in diameter than their corresponding inner passageways 222,226. Whereas in the T-fitting 200 illustrated in FIG. 7 the outer passageways 220,224 are identical in diameter with one another and the inner passageways 222,226 are identical in diameter with one another, the invention is not so limited. The outer passageways 220,224 can just as equally have different sizes, as can the inner passageways 222,226.

Additionally, the outer and inner pipe-receiving sections 212,214 and 216,218 have respective outer annular shoulders 228 and 230 with respective outwardly-facing internal surfaces 232 and 234 formed at the transitions between the outer and inner sections. Similarly, the body 202 and the inner-pipe receiving sections 214,218 have respective inner annular shoulders 236 and 238 with respective outwardly-facing internal surfaces 240 and 242 formed at the transitions between the inner sections and the body. The outer shoulders 228 and 230 adapt the respective outer pipe-receiving sections 232 and 216 to abut with ends of respective pipes (not shown) of one predetermined maximum diameter size when the latter are inserted into and received with the outer passageways 220 and 224 thereof. The inner shoulders 236 and 238 adapt the respective inner pipe-receiving sections 214 and 218 to abut with ends of respective pipes (not shown) of a different predetermined maximum diameter size when the latter are inserted through the respective outer passageways 220 and 224 and received in the respective inner passageways 222 and 226 of the inner pipe-receiving sections 214 and 218. In the illustrated embodiment, the predetermined maximum diameter size of pipe insertable into the inner pipe-receiving sections 214 and 218 is less than that of pipe insertable into the outer pipe-receiving sections 212 and 216.

The other of the pipe-connecting ends, that is the middle end 210, is disposed generally between and offset from the common axis A of the upper and lower pipe-connecting ends 206 and 208. The middle pipe-connecting end 210 has an axis B extending in a generally orthogonal relation to the common axis A. The diameter of the middle end 210 can be the same, larger or smaller than the respective sections of the upper and lower ends 206 and 208.

The one limitation on the relative diaxeter sizes of the outer and inner pipe-receiving sections 212,214 and 216,218 of respective ends 206 and 208 is that the diameters cannot be so far apart as to cause back flow or a restriction in flow of fluid through the larger ones of the pipes which fit the resective ends 206–210. One example of an acceptable variation in pipe sizes accommodated by the T-fitting 200 is from 1¼ to 1½ inches. Other examples include 1¼ to 2 inches, 1¼ to 2½ inches, 1¼ to 3 inches, and 2 to 3 inches. As can be appreciated, other variations can exist.

The pipes are connected to the respective pipe-connecting ends 206,208 and 210 by any suitable means, such as gluing together.

While the invention has been described as having a specific embodiment, it will be understood that it is capable of further modification. This application is, therefore, intended to cover any variations, uses or adaptations of the invention following the general principles thereof and including such departures from the present disclosure as come within known or customary practice in the art to which this invention pertains and fall within the limits of the appended claims.

What is claimed is:

1. In a sump system having a primary and a secondary backup pump, a T-fitting fluidly connecting the primary pump and the secondary pump to a common exhaust and for use with pipes of different diameters, said T-fitting comprising:

a generally T-shaped hollow body defining a central flow transition passageway;

at least three spaced-apart pipe-connecting hollow ends formed on said body in flow communication with said central flow transition passageway;

a pair of said pipe-connecting ends sharing a common axis and being disposed in opposing relation on said body, each of said pair of pipe-connnecting ends having a pair of tandemly-arranged outer and inner pipe-receiving sections defining respective outer and inner passageways, said inner passageways being in flow comunication with said outer passageways and said central passageway, said outer passageways being larger in diameter than said inner passageways;

an outer annular shoulder with an outwardly facing internal surface formed at the transition between said outer and inner pipe-receiving sections and adapted to abut the end of a pipe having an outer diameter slightly smaller than said outer pipe-receiving sections;

an inner annular shoulder with an outwardly facing internal surface formed at the transition between said central flow transition passageway and said inner pipe-receiving sections adapted to abut the end of a pipe having an outer diameter slightly smaller than said inner pipe-receiving sections; and, wherein said T-fitting is made of polyvinylchloride material and is connected to pipes made of polyvinylchloride material having outer diameters slightly smaller than said respective outer or inner pipe-receiving sections by gluing into said respective outer or inner pipe-receiving sections.

2. The T-fitting of claim 1 wherein the other of said pipe-connecting ends is disposed generally between said pair of pipe-connecting ends sharing a common axis, said other pipe-connecting end being offset from said common axis and extending generally orthogonally therefrom.

3. The T-fitting of claim 1 further comprising a fastening means on the exterior surface of said T-fitting for fastening thereon a water level sensor means for electrically sensing the water level to energize the secondary pump.

4. The T-fitting of claim 1 wherein the other of said pipe-connecting ends is adapted to receive a one-way valve.

* * * * *